(12) United States Patent
Zhang et al.

(10) Patent No.: US 9,318,918 B2
(45) Date of Patent: Apr. 19, 2016

(54) ELECTRICAL ENERGY SUPPLY SYSTEM

(71) Applicant: CHUNG-HSIN ELECTRIC & MACHINERY MFG. CORPORATION, Taoyuan Hsien (TW)

(72) Inventors: Ruiming Zhang, Taoyuan Hsien (TW); Ting-Kuan Li, Taoyuan Hsien (TW); Jr-Rung Chen, Taoyuan Hsien (TW); Wei-Lun Huang, Taoyuan Hsien (TW)

(73) Assignee: Chung-Hsin Electric & Machinery Mfg. Corp., Taoyuan Hsien (TW)

( * ) Notice: Subject to any disclaimer, the term of this patent is extended or adjusted under 35 U.S.C. 154(b) by 390 days.

(21) Appl. No.: 13/950,216

(22) Filed: Jul. 24, 2013

(65) Prior Publication Data

US 2014/0207305 A1    Jul. 24, 2014

(30) Foreign Application Priority Data

Jan. 24, 2013  (TW) .............................. 102102598 A (51) Int. Cl.
| | |
|---|---|
| G06F 19/00 | (2011.01) |
| H02J 9/06 | (2006.01) |
| H02J 1/10 | (2006.01) |
| H02J 7/35 | (2006.01) |

(52) U.S. Cl.
CPC ................. *H02J 9/061* (2013.01); *H02J 1/102* (2013.01); *H02J 7/35* (2013.01); *H02J 2001/106* (2013.01); *Y02B 10/72* (2013.01)

(58) Field of Classification Search
CPC ....... H02J 1/105; H02J 7/35; H02J 2001/106; H02J 9/061

USPC .......................................................... 700/298
See application file for complete search history.

(56) References Cited

U.S. PATENT DOCUMENTS

| | | | |
|---|---|---|---|
| 6,357,013 B1 * | 3/2002 | Kelly ..................... | G06F 1/3228 713/320 |
| 6,787,259 B2 * | 9/2004 | Colborn ............ | H01M 8/04559 429/430 |
| 2004/0053093 A1 * | 3/2004 | Colborn ............ | H01M 8/04559 429/430 |
| 2006/0066105 A1 * | 3/2006 | Johnson ............ | H01M 8/04089 290/1 A |
| 2009/0044026 A1 * | 2/2009 | Li ........................... | G06F 1/263 713/300 |
| 2009/0181265 A1 * | 7/2009 | Lai ..................... | H01M 8/04201 429/9 |
| 2014/0207305 A1 * | 7/2014 | Zhang ..................... | H02J 1/102 700/298 |

* cited by examiner

*Primary Examiner* — Michael D Masinick (57) ABSTRACT

An electrical energy supply system providing voltage to a load and including an external power group and a DC supply device is disclosed. The external power group provides an external voltage. The DC supply device includes a bus, a converting unit, a storage unit and a smart energy management system (SEMS). The bus receives the external voltage and is coupled to the load. The converting unit converts the external voltage into a converted voltage or converts a stored voltage to generate a converted result and provides the converted result to the bus. The storage unit stores the converted voltage or provides the stored voltage to the converting unit. The SEMS controls at least one of the converting unit, the external power group and the load according to at least one of the external voltage, a voltage level of the bus and a voltage level of the storage unit.

18 Claims, 7 Drawing Sheets

ELECTRICAL ENERGY SUPPLY SYSTEM

CROSS REFERENCE TO RELATED APPLICATIONS

This application claims priority of Taiwan Patent Application No. 102102598, filed on Jan. 24, 2013, the entirety of which is incorporated by reference herein.

BACKGROUND OF THE INVENTION

1. Field of the Invention

The invention relates to an electrical energy supply system, and more particularly to an electrical energy supply system comprising a smart energy management system (SEMS).

2. Description of the Related Art

Common energy-management units calculate power consumption of loads and power rates of loads. These energy-management units do not actively manage the power of the loads. Thus, when an important load cannot receive enough power, the important load may not operate normally. The load may turn off, causing data in the load to be lost.

BRIEF SUMMARY OF THE INVENTION

In accordance with an embodiment, an electrical energy supply system provides voltage to a first load and comprises an external power group and a DC supply device. The external power group provides an external voltage. The DC supply device receives the external voltage and comprises a first bus, a first converting unit, a first storage unit and a first smart energy management system (SEMS). The first bus receives the external voltage and is coupled to the first load. The first converting unit converts the external voltage into a first converted voltage or converts a first stored voltage to generate a first converted result and provides the first converted result to the first bus. The first storage unit stores the first converted voltage or provides the first stored voltage to the first converting unit. The first SEMS controls at least one of the first converting unit, the external power group and the first load according to at least one of the external voltage, a voltage level of the first bus and a voltage level of the first storage unit.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
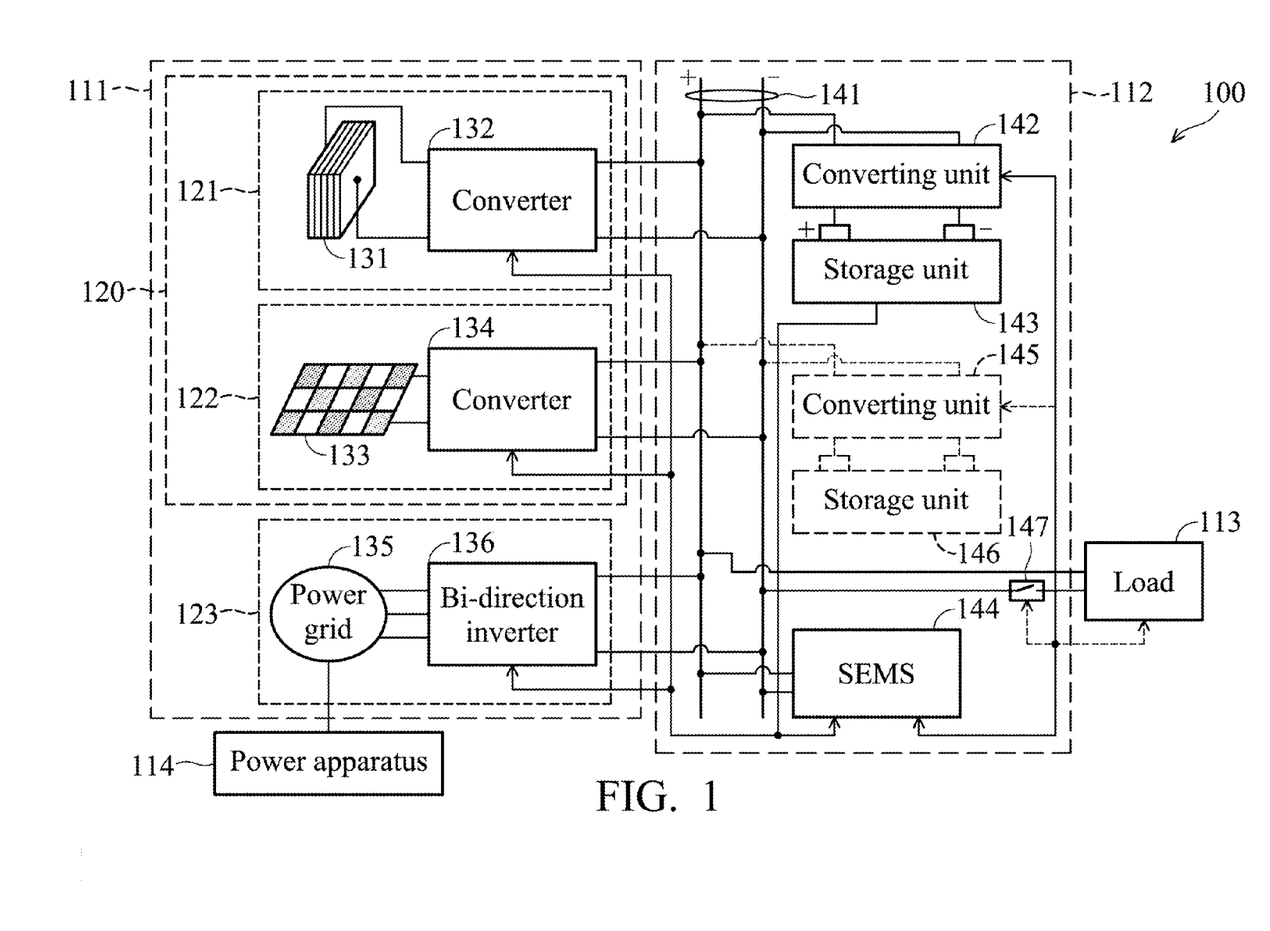
FIG. 1 is a schematic diagram of an exemplary embodiment of an electrical energy supply system.

FIG. 1 is a schematic diagram of an exemplary embodiment of an electrical energy supply system 100. The electrical energy supply system 100 is capable of managing voltage of household appliances, buildings or base stations or standby voltage of servers. As shown in FIG. 1, the electrical energy supply system 100 provides voltage to the load 113 and comprises an external power group 111 and a DC supply device 112.

The invention is not limited to the kinds of the load 113. In one embodiment, the load 113 is a high voltage (HV) load. The HV load requires a high voltage, of about 360V-430V. In another embodiment, the load 113 is a low voltage (LV) load. The LV load requires a low voltage, of about 12V-48V.

The external power group 111 comprises a renewable-energy unit 120 and a main power-supply unit 123, but the disclosure is not limited thereto. In other embodiments, the external power group 111 may only comprise one of the renewable-energy unit 120 and the main power-supply unit 123. As shown in FIG. 1, the renewable-energy unit 120 comprises a fuel-cell module 121 and a solar energy module 122, but the disclosure is not limited thereto. In other embodiment, the renewable-energy unit 120 may only comprise the fuel-cell module 121, the solar module 122 or another renewable-energy module.

The fuel-cell module 121 comprises a fuel-cell group 131 and a converter 132. In this embodiment, the fuel-cell group 131 comprises a plurality of fuel cells. The fuel cells are connected in parallel. The converter 132 converts the voltage of the fuel-cell group 131 to generate a converted result and provides the converted result to the bus 141. The invention does not limit the converted result generated by the converter 132. In one embodiment, the converted result is 360V-430V. In another embodiment, the converted result is 12V-48V.

The solar energy module 122 comprises a photovoltaic (PV) panel 133 and a converter 134. The PV panel 133 collects solar energy to generate a collected result and outputs the collected result. The converter 134 provides an output voltage to the bus 141 according to the collected result of the PV panel 133. In one embodiment, the converter 134 employs maximum power point tracking (MPPT). The invention does not limit the output voltage of the converter 134. In one embodiment, the output voltage of the converter 134 is 360V-430. In another embodiment, the output voltage of the converter 134 is 12V-48V.

The main power-supply unit 123 is coupled between the bus 141 and a power apparatus 114 to provide the voltage from the power apparatus 114 to the bus 141 or to provide the voltage of the bus 141 to the power apparatus 114. For example, when the voltage level of the bus 141 is less than the voltage level of the power apparatus 114, the main power-supply unit 123 provides the voltage from the power apparatus 114 to the bus 141. When the voltage level of the bus 141 is higher than the voltage level of the power apparatus 114, the main power-supply unit 123 provides the voltage of the bus 141 to the power apparatus 114.

In this embodiment, the main power-supply unit 123 comprises a power grid 135 and a bi-direction inverter 136. The invention is not limited to one kind of power grid 135. In one embodiment, the power grid 135 is a single-phase three-wires (1Φ 3 W) system to provide power at 220V/60 Hz. In another embodiment, the power grid 135 is a three-phases four-wires (3Φ 4 W) system to provide power at 380V/60 Hz.

When the voltage level of the bus 141 does not match a contribution level, the bi-directional inverter 135 converts the voltage from the power apparatus 114 to generate a converted result and provides the converted result to the bus 141. In other embodiments, when the voltage level of the bus 141 matches the contribution level, the bi-directional inverter 134 converts the voltage of the bus 141 to generate a converted result and provides the converted result to the power apparatus 114 via the power grid 135.

In this embodiment, the voltage provided from the renewable-energy unit 120 and the voltage provided from the main power-supply unit 123 are referred to an external voltage and are output to the bus 141. The DC supply device 112 receives the external voltage generated by the external power group 111 and comprises a bus 141, a converting unit 142, a storage unit 143 and a smart energy management system (SEMS) 144. The bus 141 receives the external voltage generated from the external power group 111 and is coupled to the load 113.

In one embodiment, the converting unit 142 converts the external voltage of the bus 141 to generate a first converted voltage. In another embodiment, the converting unit 142 converts a first stored voltage to generate a converted result and provides the converted result to the bus 141. The invention does not limit the kind of the converting unit 142. In one embodiment, the converting unit 142 is an HV converter when the voltage level of the bus 141 is high, such as 360V-430V. In another embodiment, the converting unit 142 is an LV converter when the voltage level of the bus 141 is low, such as 12V-48V. In other embodiments, the converting unit 142 is a bi-directional converter to charge or discharge the storage unit 143.

The storage unit 143 stores the first converted voltage generated by the converting unit 142 or provides a first stored voltage to the converting unit 142. In one embodiment, the storage unit 143 is a battery. When the external voltage is suddenly interrupted, the storage unit 143 is capable of providing voltage to the bus 141 to ensure that the load 113 can operate normally.

In one embodiment, when the voltage level of the bus 141 reaches a pre-determined level, it represents that the voltage of the bus 141 is sufficient. Thus, the converting unit 142 converts the voltage of the bus 141 to generate the first converted voltage and provides the first converted voltage to the storage unit 143. At this time, the storage unit 143 is charged. When the voltage level of the bus 141 is less than the pre-determined level, it represents that the voltage level of the bus 141 is not sufficient to drive the load 113. Thus, the storage unit 143 provides the first stored voltage to the converting unit 142. The converting unit 142 converts the first stored voltage and provides the converted result to the bus 141 to increase the voltage of the bus 141. At this time, the storage unit 143 is discharged.

The invention does not limit amount of converting units and storage units. In one embodiment, the DC supply device 112 only comprises a single converting unit and a single storage unit. In another embodiment, the DC supply device 112 comprises a single converting unit and a plurality of storage units. In this case, the single converting unit, successively or simultaneously, charges or discharges the storage units.

In other embodiments, the DC supply device 112 comprises a plurality of converting units, such as 142 and 145, and a plurality of storage units, such as 143 and 146. Since the operations of the converting units 142 and 145 are the same, the converting unit 142 is provided as an example. Similarly, since the operations of the storage units 143 and 146 are the same, the storage unit 143 is provided as an example.

The SEMS 144 controls at least one of the converting unit 142, the external power group 111 and the load 113 according to at least one of the external voltage provided by the external power group 111, the voltage level of the bus 141 and the voltage level of the storage unit 143. The invention does not limit the internal structure of the SEMS 144. In one embodiment, the SEMS 144 comprises a combination of microcontroller, digital signal controllers, counters, detectors, input/output channels and memories.

The SEMS 144 controls the converting unit 142 to charge or discharge the storage unit 143 according to the voltage level of the bus 141. For example, when the voltage level of the bus 141 reaches a pre-determined level, the converting unit 142 converts the external voltage provided by the external power group 111 to generate a converted result and provides the converted result to the storage unit 143 to charge the storage unit 143. When the voltage level of the bus 141 is less than the pre-determined level, it represents that the voltage on the bus 141 is not sufficient. Thus, the storage unit 143 provides the first stored voltage to the converting unit 142. The converting unit 142 converts the first stored voltage to provide a converted result to the storage unit 143. At this time, the storage unit 143 is discharged.

In another embodiment, the SEMS 144 controls the external power group 111 to adjust the external voltage provided by the external power group 111 according to the voltage level of the bus 141. For example, when the voltage level of the bus 141 is less than a pre-determined level, it represents that the voltage of the bus 141 is not sufficient. Thus, the SEMS 144 outputs a control command. The external power group 111 adjusts the external voltage according to the control command.

The invention does not limit how the SEMS 144 controls the external power group 111. In one embodiment, the SEMS 144 transmits a plurality of control commands to each element of the external power group 111 via a plurality of transmittal lines. In another embodiment, the SEMS 144 transmits one control command to each elements of the external power group 111 via a single transmittal line. The elements of the external power group 111 decode the control command and then adjust output voltage and output current according to the decoded result.

In other embodiments, the SEMS 144 de-activates the load 113 according to the voltage level of the bus 141. For example, when the voltage level of the bus 141 is less than a pre-determined level, it represents that the voltage of the bus 141 is not sufficient. Thus, the SEMS 144 de-activates the load 113. The invention does not limit how the SEMS 144 de-activates the load 113. In one embodiment, the load 113 has an auto turn-off function. In this case, the SEMS 144 sends a control command. The load 113 performs the turn-off function according to the control command. In this case, the SEMS 144 sends a control command. The switch 147 stops providing voltage to the load 113 according to the control command.

The invention does not limit amount of the load. In one embodiment, a plurality of loads are coupled to the bus 141. When the voltage level of the bus 141 is less than a pre-determined level, the SEMS 141 de-activates the loads, which have lower weight indexes, according to a weight index. In other embodiments, the SEMS 144 controls a plurality of loads and a plurality of switches via a single transmittal line or a plurality of transmittal lines.

Figure 2:
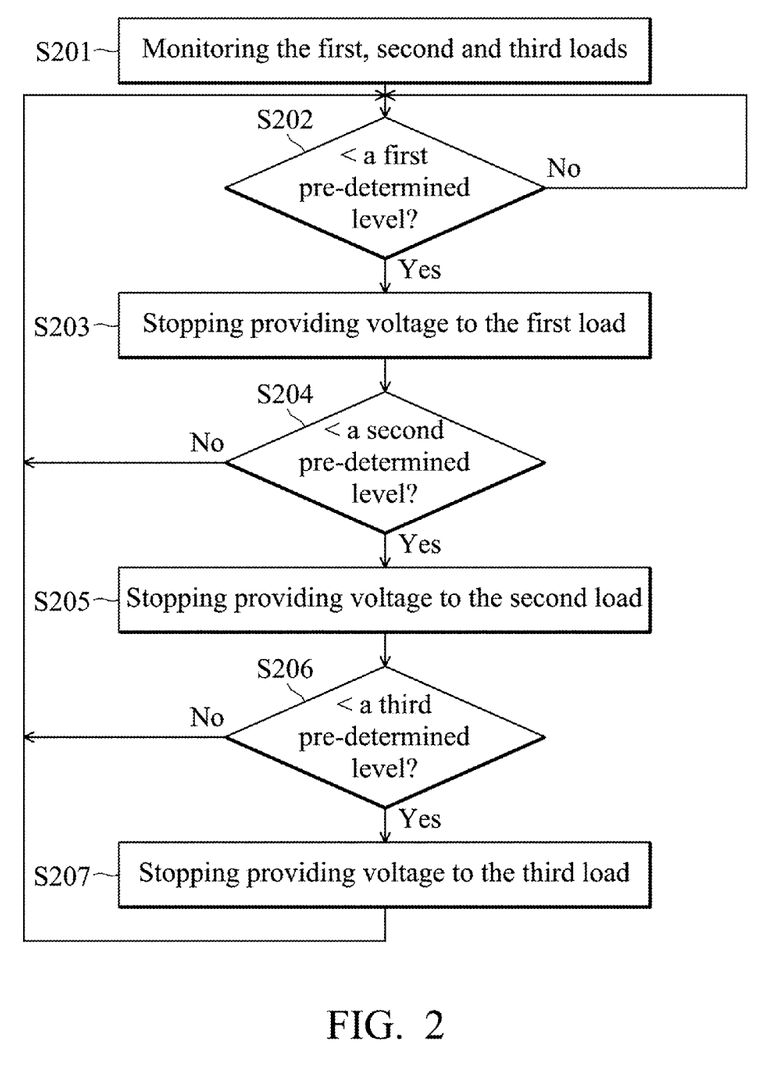
FIGS. 2-5 are schematic diagrams of other exemplary embodiments of the SEMS.

FIG. 2 is a schematic diagram of an exemplary embodiment of the SEMS. In this embodiment, the SEMS 144 sequentially stops providing voltage to the loads according to the weight indexes. It is assumed that the bus 141 is coupled to a first load, a second load and a third load, and each of the first, second and third loads has a weight index, wherein the weight index of the first load is less than the weight index of the second load and the weight index of the second load is less than the weight index of the third load.

First, the operations of the first, second and third loads are monitored (step S201). Then, it is determined whether the voltage level of the bus 141 is less than a first pre-determined level (step S202). In one embodiment, step 202 determines the dynamic voltage level of the bus 141. In other words, the jump frequency of the voltage level of the bus 141 is determined. In another embodiment, step S202 is to determine the static level of the bus 141. In other words, the voltage level of the bus 141 is determined. If the voltage level of the bus 141 is not less than the first pre-determined level, step S202 is executed. If the voltage level of the bus 141 is less than the first pre-determined level, step S203 is executed to stop providing voltage to the first load. In this embodiment, since the weight index of the first load is minimal, the voltage of the bus 141 is not provided to the first load anymore.

The invention does not limit how the voltage is not provided to the first load anymore. In one embodiment, a switch element coupled between the first load and the bus is turned off to stop providing the voltage. In another embodiment, a turning off command is provided to the first load. Thus, the first load does not receive the voltage of the bus 141.

After the voltage is not provided to the first load, the voltage level of the bus 141 should arrive to a second pre-determined level. Thus, step S204 is to determine whether the voltage level of the bus 141 is less than the second pre-determined level. If the voltage level of the bus 141 is not less than the second pre-determined level, step S202 is executed. If the voltage level of the bus 141 is less than the second pre-determined level, the voltage is not provided to the second load (step S205).

Then, step S206 is to determine whether the voltage level of the bus 141 is less than a third pre-determined level. If the voltage level of the bus 141 is not less than the third pre-determined level, step S202 is executed. If the voltage level of the bus 141 is less than the third pre-determined level, the voltage is not provided to the third load (step S207) and step S202 is executed. Since the weight index of the third load is maximal, the third load does not receive the voltage last.

A user can define the weight index of each load according to the importance of the loads. When the voltage of the bus is not sufficient, the voltage is not provided to the unimportant loads and the voltage is still provided to the important loads such that the operations of the important loads are maintained. Thus, a smart energy adjustment function and an active load management function are achieved. In addition, when the voltage of the bus is not sufficient, the external power group is controlled first to increase the external voltage. In other embodiment, the storage unit is discharged to increase the voltage of the bus. When the voltage of the bus cannot be increased, the voltage is not provided to the loads.

In other embodiments, a user provides time and data information to the SEMS 144. The SEMS 144 charges or discharges the storage unit 143 via the converting unit 142 according to the time and data information.

Figure 3:
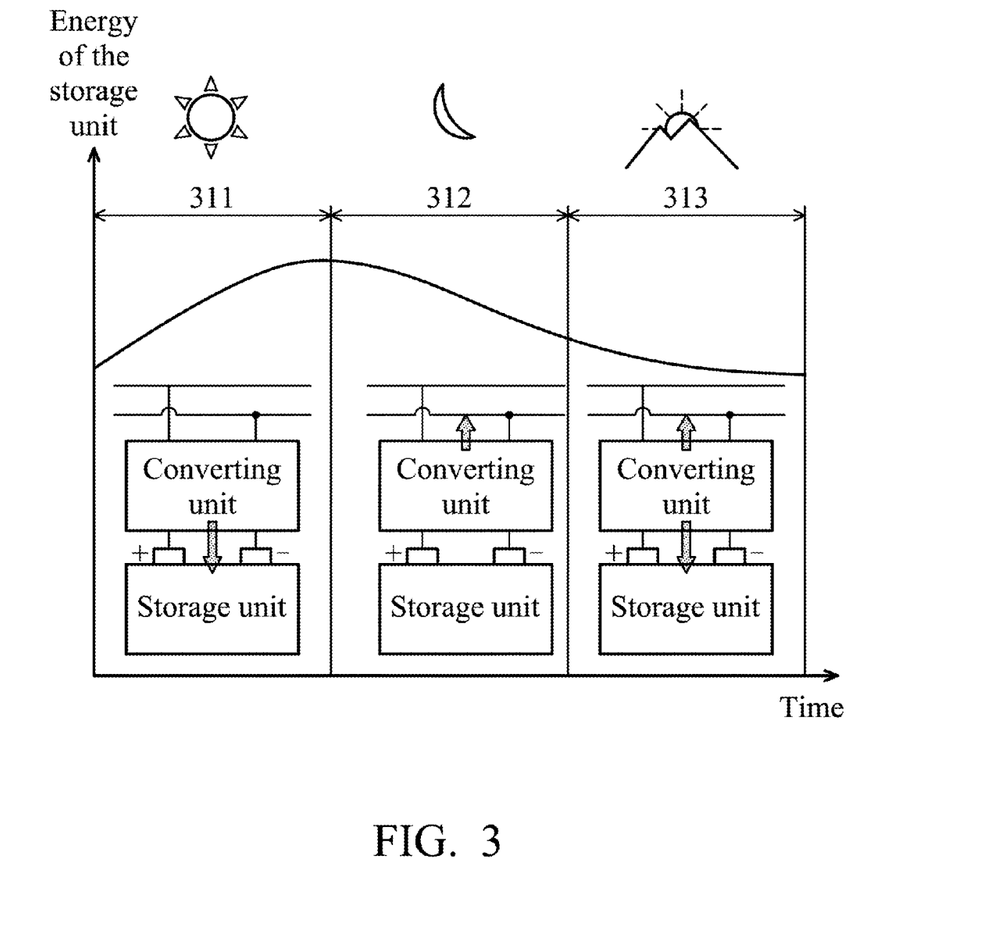

FIG. 3 is a schematic diagram of an exemplary embodiment of a control method of the SEMS. In this embodiment, the external power group 111 comprises the renewable-energy unit 120 and the main power-supply unit 123. In the period 311, such as in the morning, solar energy is sufficient. Thus, the SEMS 144 controls the converting unit 142 to convert the external voltage provided by the external power group 111. At this time, the storage unit 143 is charged.

In the period 312, such as at night, solar energy is not sufficient, or solar energy does not exist in the period 312. Thus, the SEMS 144 controls the converting unit 142 to convert the stored voltage provided by the storage unit 143. At this time, the storage unit 143 is discharged.

In the period 313, such as in the early morning, the SEMS 144 controls the converting unit 142 to convert the external voltage or the stored voltage according to the voltage level of the storage unit 143. For example, when the voltage level of the storage unit 143 is higher than a pre-determined level, the converting unit 142 converts the stored voltage. When the voltage level of the storage unit 143 is less than the pre-determined level, the converting unit 142 converts the external voltage to charge the storage unit 143.

When the DC supply device 112 comprises a plurality of converting units, the SEMS 144 controls the different converting units via the different transmittal lines. In other embodiments, the SEMS 144 controls a plurality of converting units via a single transmittal line. In this case, each converting unit decodes the control command transmitted by the corresponding transmittal line and operates according to the recoded result. In one embodiment, the converting unit may convert voltage or stop converting.

Figure 4:
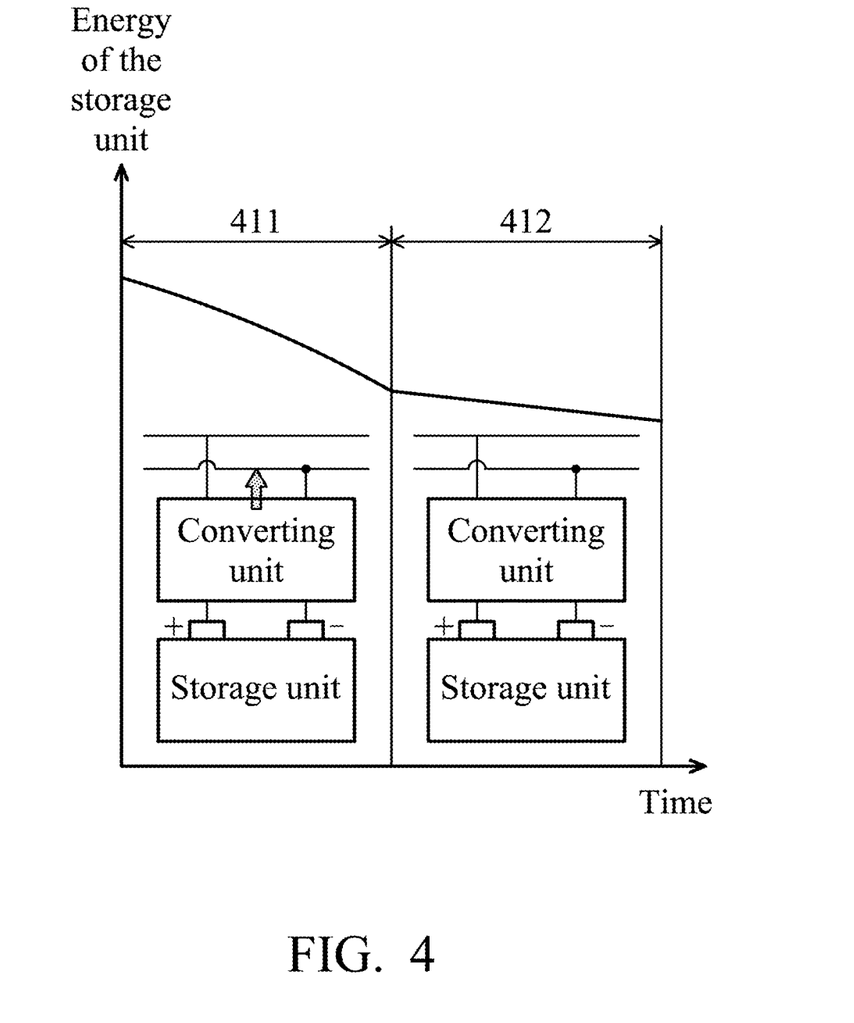

FIG. 4 is a schematic diagram of another exemplary embodiment of the control method. In this embodiment, the external power group 111 only comprises the renewable-energy unit 120. Since the voltage of the bus 141 is not sufficient, the SEMS 144 controls the converting unit 142 to convert the stored voltage provided by the storage unit 143 during the period 411. At this time, the storage unit 143 is discharged.

Figure 5:
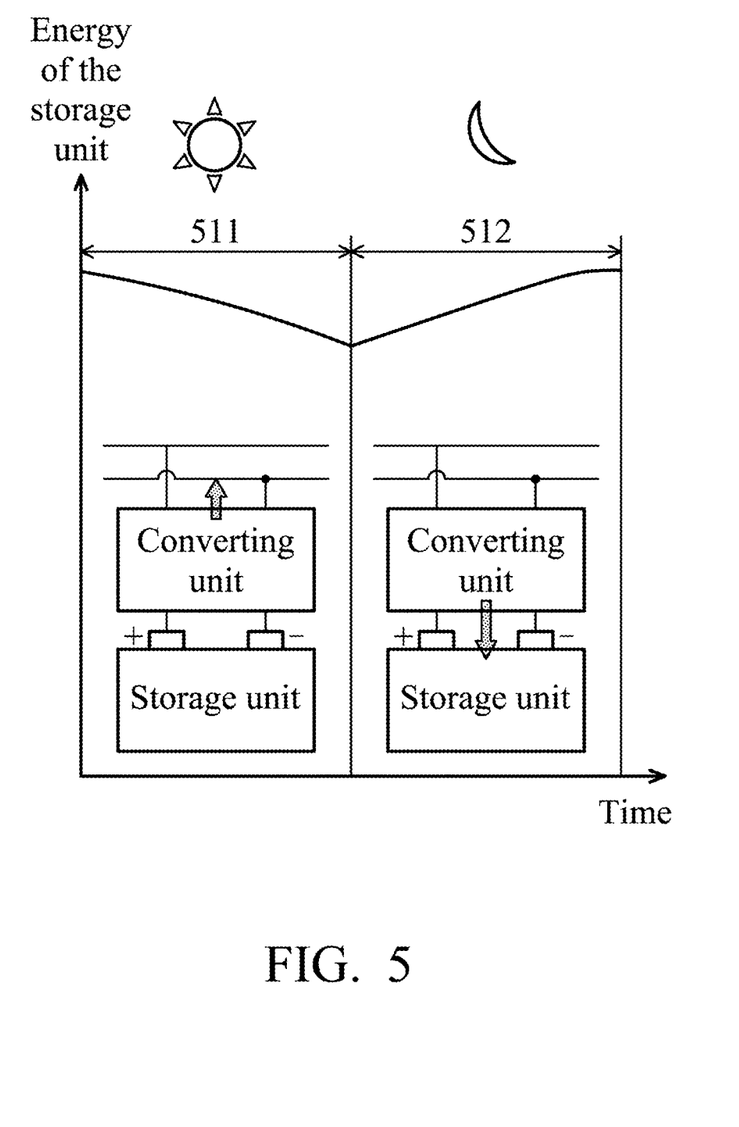

During the period 412, the voltage level of the storage unit 143 is less than a pre-determined level. Thus, the SEMS 144 de-activates the converting unit 142 to stop converting the stored voltage provided by the storage unit 143. At this time, the voltage level of the storage unit 143 is a minimum level. In one embodiment, the SEMS 144 detects the voltage levels of various storage units via the different transmittal lines FIG. 5 is a schematic diagram of another exemplary embodiment of the control method. In this embodiment, the external power group 111 only comprises the main power-supply unit 120. The period 511 is a peak hour period. At this time, a power rate is expensive. Thus, the SEMS 144 controls the converting unit 142 to convert the stored voltage provided by the storage unit 143. At this time, the storage unit 143 is discharged.

The period 512 is an off-peak hour period and the power rate is inexpensive. Thus, the SEMS 144 controls the converting unit 142 to convert the external voltage provided by the external power group 111 to a converted result and provides the converted result to the storage unit 143. At this time, the storage unit 143 is charged.

Figure 6:
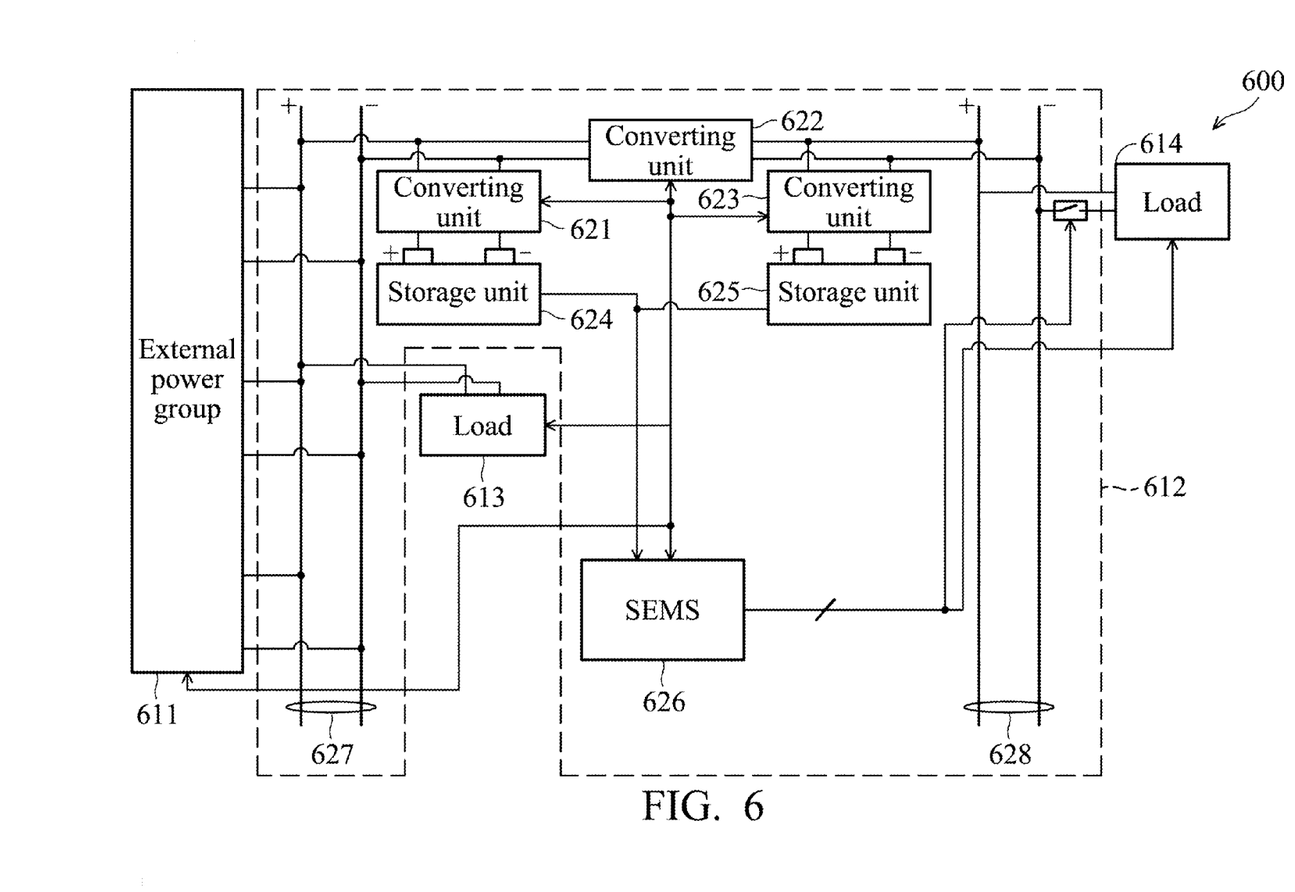
FIGS. 6-7 are schematic diagrams of other exemplary embodiments of the electrical energy supply system.

FIG. 6 is a schematic diagram of another exemplary embodiment of the electrical energy supply system. The electrical energy supply system 600 comprises an external power group 611 and a DC supply device 612 and provides voltage to the loads 613 and 614. In this embodiment, the load 613 is an HV DC load. The voltage required by the HV DC load is 360V-430V. The load 614 is an LV DC load. The voltage of the LV DC load is 12V-48V. Since the external power groups 611 and 111 operate on the same principle, a description of the external power group 611 is omitted for brevity.

The DC supply device 612 comprises converting units 621-623, storage units 624-625, a SEMS 626 and buses 627-628. Since the operations of the converting units 621 and 142 are the same, the operations of the storage units 624 and 143 are the same, and the operations of the buses 624 and 143 are the same, the descriptions of the converting unit 621, the storage unit 624 and the bus 627 are omitted.

The converting unit 622 converts the external voltage provided by the external power group 111 to generate a second converted voltage. In this embodiment, the converting unit 622 is a bi-directional converter. In one embodiment, when the voltage of the bus 627 is sufficient and is capable of driving the load 613 and the voltage of the bus 628 is not sufficient and is not capable of driving the load 614, the converting unit 622 converts the voltage of the bus 627 to generate a converted result according to a control command sent from the SEMS 626 and provides the converted result to the bus 628.

Similarly, when the voltage of the bus 628 is sufficient and is capable of driving the load 614 and the voltage of the bus 627 is not sufficient and is not capable of driving the load 613, the converting unit 622 converts the voltage of the bus 628 to generate a converted result according to a control command sent from the SEMS 626 and provides the converted result to the bus 627.

In one embodiment, the converting unit 623 converts the second converted voltage generated by the converting unit 622 to generate a third converted voltage. In another embodiment, the converting unit 623 converts a second stored voltage to generate a converted result and provides the converted result to the bus 628. Since the operations of the converting units 623 and 142 are the same, the description of the converting unit 623 is omitted.

In one embodiment, the storage unit 625 stores the third converted voltage generated by the converting unit 623. In another embodiment, the storage unit 625 provides the second stored voltage to the converting unit 623. In one embodiment, the SEMS 626 generates a control signal to the converting unit 623 according to the voltage level of the bus 628.

For example, when the voltage level of the bus 628 is higher than or equal to a pre-determined level, the converting unit 623 converts the second converted voltage generated by the converting unit 622 to generate a converted result and provides the converted result to the storage unit 625. At this time, the storage unit 625 is charged. When the voltage level of the bus 628 is less than the pre-determined level, the converting unit 623 converts the second stored voltage. At this time, the storage unit 625 is discharged.

The bus 628 receives the second converted voltage generated by the converting unit 622 and is coupled to the load 614. In the normal operation, the voltage level of the bus 628 is 12V-48V to drive the LV DC load, and the voltage level of the bus 627 is 360V-430V to drive the HV DC load.

When the voltage of the bus 627 is not sufficient, the SEMS 626 controls the external power group 611 to increase the external voltage, controls the converting unit 621 to receive the voltage of the storage unit 624, controls the converting unit 622 to receive the voltage of the bus 628, or stops driving the load 613. Similarly, when the voltage of the bus 628 is not sufficient, the SEMS 626 also controls at least one of the external power group 611, the converting unit 622, 623 and the load 614 to adjust the voltage of the bus 628.

In this embodiment, the SEMS 626 controls at least one of the converting units 621 and 623 and the loads 613 and 614 according to at least one of the external voltage generated by the external power group 611, the second converted voltage generated by the converting unit 622, the voltage levels of the buses 627 and 628 and the voltage levels of the storage units 624 and 625.

Figure 7:
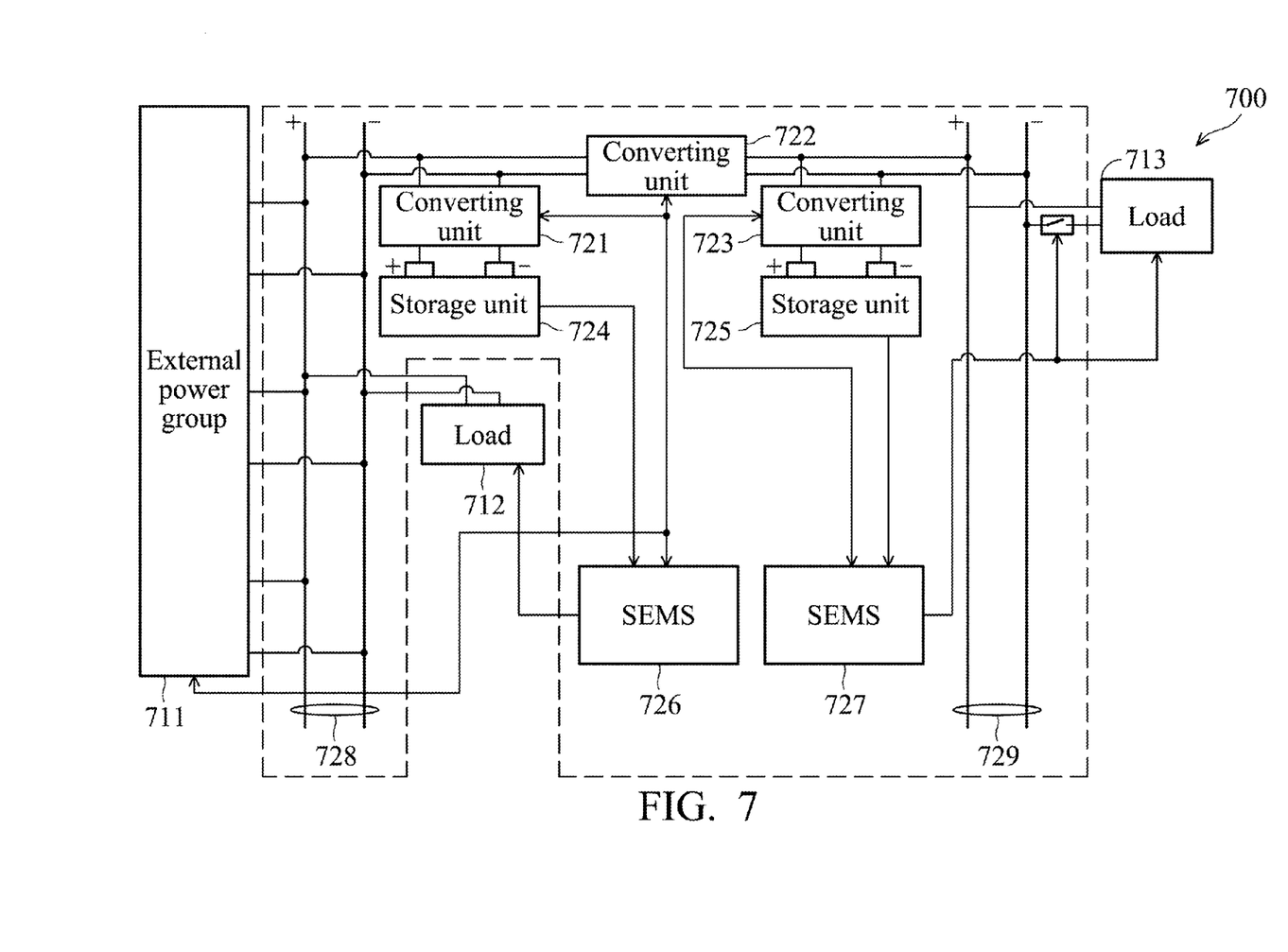

FIG. 7 is a schematic diagram of another exemplary embodiment of the electrical energy supply system. FIG. 7 is similar to FIG. 6 except for the addition of a SEMS 727. In this embodiment, the SEMS 726 controls the elements coupled to the bus 728. In one embodiment, the SEMS 726 controls at least one of the converting unit 721 and the load 712 according to at least one of the external voltage generated by the external power group 711, the voltage level of the bus 728 and the voltage level of the storage unit 724.

The SEMS 727 controls the elements coupled to the bus 729. In one embodiment, the SEMS 727 controls at least one of the converting unit 723 and the load 713 according to at least one of the converted voltage generated by the converting unit 722, the voltage level of the bus 729 and the voltage level of the storage unit 725.

In another embodiment, if the bus 728 is coupled to many loads or many important loads are coupled to the bus 728, various converting units and various storage units are designed and coupled to the bus 728. Similarly, various converting units are coupled between the buses 728 and 729 in other embodiments.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electrical energy supply system providing voltage to a first load, comprising:
   an external power group providing an external voltage; and
   a DC supply device receiving the external voltage and comprising:
   a first bus receiving the external voltage and coupled to the first load;
   a first converting unit converting the external voltage into a first converted voltage when a voltage level of the first bus reaches a pre-determined level, and converting a first stored voltage to generate a converted result when the voltage level of the first bus is less than the pre-determined level;
   a first storage unit storing the first converted voltage when the voltage level of the first bus reaches the pre-determined level and providing the first stored voltage to the first converting unit when the voltage level of the first bus is less than the pre-determined level; and
   a first smart energy management system (SEMS) controlling at least one of the first converting unit, the external power group and the first load according to at least one of the external voltage, a voltage level of the first bus and a voltage level of the first storage unit, wherein the first SEMS controls the external power group to adjust the external voltage according to the voltage level of the first bus.

2. The electrical energy supply system as claimed in claim 1, wherein the first SEMS controls the first converting unit according to the voltage level of the first bus such that the first converting unit converts the external voltage or the first stored voltage.

3. The electrical energy supply system as claimed in claim 1, wherein the first SEMS de-activates the first load according to the voltage level of the first bus.

4. The electrical energy supply system as claimed in claim 3, wherein the first SEMS sends a control command, and the first load performs a turning-off operation according to the control command.

5. The electrical energy supply system as claimed in claim 3, further comprising:
   a switch coupled between the first bus and the first load, wherein the first SEMS sends a control command and the switch stops providing voltage to the first load according to the control command.

6. The electrical energy supply system as claimed in claim 1, wherein the first bus is coupled to a second load, and when the voltage level of the first bus is less than a first pre-determined level, the first SEMS stops providing voltage to the first load according to a weight index.

7. The electrical energy supply system as claimed in claim 6, wherein after ceasing to provide voltage to the first load, when the voltage level of the first bus is less than a second pre-determined level, the first SEMS stops providing voltage to the second load according to the weight index.

8. The electrical energy supply system as claimed in claim 1, wherein the external power group comprises:
   a renewable-energy unit; and
   a main power-supply unit coupled between the first bus and a power apparatus to provide voltage from the power apparatus to the first bus or to provide voltage from the first bus to the power apparatus.

9. The electrical energy supply system as claimed in claim 8, wherein the renewable-energy unit comprises at least one of a fuel-cell module and a solar energy module.

10. The electrical energy supply system as claimed in claim 8, wherein when the voltage level of the first bus matches a contribution level, the main power-supply unit provides the voltage from the first bus to the power apparatus, and when the voltage level of the first bus does not match the contribution level, the first SEMS controls the main power-supply unit to provide the voltage from the power apparatus to the first bus.

11. The electrical energy supply system as claimed in claim 1, wherein when the external power group comprises a renewable-energy unit and a main power-supply unit, the first SEMS controls the first converting unit to convert the external voltage during a first period, controls the first converting unit to convert the first stored voltage during a second period, and controls the first converting unit to convert the external voltage or the first stored voltage according to the voltage level of the first storage unit during a third period.

12. The electrical energy supply system as claimed in claim 1, wherein when the external power group only comprises a renewable-energy unit, the first SEMS controls the first converting unit to convert the first stored voltage during a first period and de-activates the first converting unit during a second period.

13. The electrical energy supply system as claimed in claim 1, wherein when the external power group only comprises a main power-supply unit, the first SEMS controls the first converting unit to convert the first stored voltage during a first period and controls the first converting unit to convert the external voltage during a second period.

14. The electrical energy supply system as claimed in claim 1, further comprising:
   a second converting unit converting the external voltage into a second converted voltage;
   a second bus receiving the second converted voltage and coupled to a second load;
   a third converting unit converting the second converted voltage into a third converted voltage or converting a second stored voltage to generate a second converted result and providing the second converted result to the second bus; and
   a second storage unit storing the third converted voltage or providing the second stored voltage to the third converting unit.

15. The electrical energy supply system as claimed in claim 14, wherein the first SEMS controls at least one of the third converting unit and the second load according to at least one of the second converted voltage, a voltage level of the second bus and a voltage level of the second storage unit.

16. The electrical energy supply system as claimed in claim 14, further comprising:
   a second SEMS controlling at least one of the third converting unit and the second load according to at least one of the second converted voltage, the voltage level of the second bus and the voltage level of the second storage unit.

17. The electrical energy supply system as claimed in claim 14, wherein during a normal operation, the voltage level of the first bus is 360V-430V and the voltage level of the second bus is 12V-48V.

18. The electrical energy supply system as claimed in claim 14, wherein the second converting unit converts a voltage of the second bus to generate a third converted result and provides the third converted result to the first bus.

* * * * *